R. BIXBY.
NUT LOCK.
APPLICATION FILED DEC. 27, 1912.
1,077,119. Patented Oct. 28, 1913.
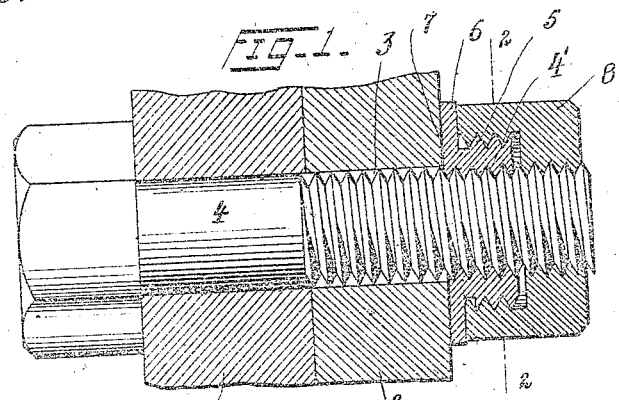
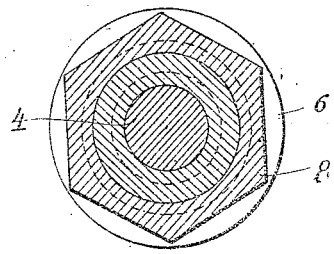
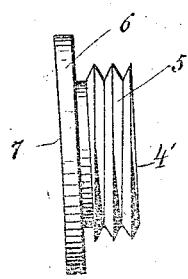  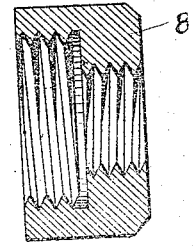
Inventor
Robert Bixby
Witnesses
R. F. Maryman
By Victor J. Evans
Attorney

UNITED STATES PATENT OFFICE.

ROBERT BIXBY, OF NORTH ANDOVER, MASSACHUSETTS.

NUT-LOCK.

1,077,119.

Specification of Letters Patent. Patented Oct. 28, 1913.

Application filed December 27, 1912. Serial No. 738,875.

*To all whom it may concern:*

Be it known that I, ROBERT BIXBY, a citizen of the United States, residing at North Andover, in the county of Essex and State of Massachusetts, have invented new and useful Improvements in Nut-Locks, of which the following is a specification.

This invention relates to nut locks and the principal object of the invention is to provide a simple and efficient device of this character which will have no more weight or take up any more room than the ordinary nut and washer and which will not be destroyed or damaged in any manner when backed off the bolt.

A further object of the invention is to provide a device of this character which does not require any special machine bolt and with which it is not necessary to use a washer.

Further objects of this invention will appear as the following specific description is read in connection with the accompanying drawing, which forms a part of this application, and in which:—

Figure 1 is a sectional view. Fig. 2 is a transverse section on the line 2—2 of Fig. 1. Fig. 3 is an elevation of a combined collar and washer. Fig. 4 is a detail sectional view of the nut.

Referring more particularly to the drawing, 1 and 2 represent the two parts to be connected together, the parts having alined openings 3 through which an ordinary machine bolt 4 is passed. The threads on this bolt preferably have a pitch of about eight to an inch. Threaded on the bolt is a collar 4' having external screw threads 5 running in an opposite direction to the threads on the bolt and having a pitch of approximately thirteen to an inch. This collar is integrally formed with an annular flange 6 which forms a washer and which is dished upon its under side, as shown at 7. The nut is shown at 8 and is provided with the central bore internally threaded to receive the threads 5 of the collar 4'. It is also provided with a reduced bore internally threaded to receive the threads of the bolt.

In operating the device, the nut 8 is threaded upon the collar and turned down thereon with considerable force. The collar and nut are then threaded to receive the bolt, and in this manner, the threads of the collar and bolt are alined when the nut is in operative position to be screwed up on the bolt. The nut is applied to the bolt in the usual manner and if the parts 4' and 8 are assembled with sufficient force prior to placing the nut upon the bolt, the washer will engage the parts to be clamped with sufficient force to clamp these parts together before the part 8 begins to turn upon the part 4'. As the part 8 turns independently of the collar 4', these parts will be separated to a certain extent owing to the fact that the threads 5 are left hand threads, while the threads on the bolt are right hand threads and by turning the part 8 to screw the same down upon the bolt an action is obtained which tends to unscrew the part 8 from the part 4'. At this time, the dished face of the washer 6 comes into play, for as the parts are separated, the part 4' will be forced tighter into engagement with the part to be clamped and the periphery of the washer will give sufficiently to accommodate this separation and will flatten itself out upon the part being clamped. The retrograde movement of the part 8 will not only tend to loosen the same on the bolt but will also screw the same up on the collar 4', which action will cause these parts to rotate as a unit.

What is claimed is:—

A nut lock comprising a collar, externally and internally threaded, the threads on the exterior of said collar being run in opposition to those on the interior of the collar and of a less pitch, said collar having an annular flange dished on its under face, and a nut having an internal thread to correspond with the external thread on the collar and an internal thread of a pitch greater than the first-mentioned threads and running in a direction opposite to said first-mentioned threads, said flange being sufficiently resilient to flatten out under compression.

In testimony whereof I affix my signature in presence of two witnesses.

ROBERT BIXBY.

Witnesses:
CHARLES CHAPLIN,
JOSEPH SPENCER.